United States Patent [19]

Hermann et al.

[11] 3,902,689

[45] Sept. 2, 1975

[54] ARRANGEMENT FOR MEASURING THE DISTANCE BETWEEN TWO SUCCESSIVE OBJECTS

[75] Inventors: Walter Hermann, Weissenfeld; Peter Kraus, Munich; Burkhart Kuhl, Ottobrunn, all of Germany

[73] Assignee: Messerschmitt-Bolkow-Blohm G.m.b.H., Munich, Germany

[22] Filed: Feb. 13, 1974

[21] Appl. No.: 442,059

[30] Foreign Application Priority Data
Feb. 15, 1973 Germany............................ 2307455

[52] U.S. Cl.......... 246/63 C; 246/167 D; 246/122 R
[51] Int. Cl.²......................................... B61L 23/14
[58] Field of Search...... 246/167 D, 122 R, 8, 63 R, 246/63 C; 104/152; 179/82; 343/711, 712, 713; 336/117, 118, 119, 130

[56] References Cited
UNITED STATES PATENTS
1,942,138   1/1934   Dicke................................ 246/63 R
3,836,770   9/1974   Helmcke et al.................. 246/167 D

*Primary Examiner*—M. Henson Wood, Jr.
*Assistant Examiner*—Reinhard J. Eisenzopf
*Attorney, Agent, or Firm*—Woodhams, Blanchard & Flynn

[57] ABSTRACT

An arrangement for measuring the distance between two successive track-carried objects which are equipped with a transmitter and a receiver. The transmitter of the forwardmost object transmits a signal which is received by the receiver of the next following object. The signal is transmitted over a line having a predefined signal attenuation factor so that the magnitude of the signal received by the receiver in the next following object is indicative of the distance to the forwardmost track-carried object. A single U-shaped core and windings associated therewith is utilized to transmit the signal into the line in the transmitter as well as receive the signal from the line in the receiver.

13 Claims, 5 Drawing Figures

ARRANGEMENT FOR MEASURING THE DISTANCE BETWEEN TWO SUCCESSIVE OBJECTS

CROSS REFERENCE TO RELATED APPLICATIONS

This application is related to the subject disclosed in U.S. Pat. Ser. No. 277,783, filed Aug. 3, 1972 now U.S. Pat. No. 3,836,770, issued Sept. 17, 1974, and is further related to the subject disclosed in 277,781 also filed on Aug. 3, 1972, now U.S. pat. no. 3,809,803, issued May 7, 1974.

FIELD OF THE INVENTION

This invention relates to an arrangement for measuring the distance between two successive track-carried objects which are equipped with transmitter and receiver wherein an electrical signal of a defined magnitude is sent out by a transmitter of the leading object and is received by a receiver in the next following object, which receiver has a defined sensitivity, and wherein the transmitter and receiver are coupled through a damped medium having defined attenuation characteristics.

BACKGROUND OF THE INVENTION

In this arrangement the damped medium is an electric line which extends along the path of travel of the object and which consists of at least two conductors which are parallel with respect to one another and are conductingly connected between each other over their entire length through a conductive foil. The conductivity of this cross connection between the conductors is substantially less than the conductivity of the conductors and at least as low as to permit the passage of magnetic flux therethrough. This results in a strong ohmic cross leakage of the line, which cross leakage in connection with the series impedance of the line results in such a strong damping of the line that the amplitude of a signal (high frequency voltage), which signal is coupled into the line from a transmitter, decreases measurably in a short line section (for example of one meter length) according to an exponential law with a negative exponent. The amplitude of the signal at any desired point of the line is thus a measurement for the distance between said point and the transmitter which couples the signal into the line. Thus it is possible by means of this line to inform an object, independent from certain reference points of its path of travel continuously of its distance from a preceding object, if its transmitter continuously sends out a signal of a defined amplitude or couples it into the line and the receiver of the following (receiving) object has a defined sensitivity.

The coupling of the transmitter and receiver with the line — with the line being constructed as a carrier having three coplanar parallel conductors — may be provided in the suggested arrangement advantageously as in inductive system wherein each transmitter and receiver has associated therewith as a coupling element a coil, the winding of which is distributed symmetrically onto two, air gap defining, U-shaped iron cores of the same dimensions. The iron cores are arranged symmetrically to the line or to its plane which runs through the air cap in the longitudinal direction.

Such a construction of the coils automatically has the consequence that the line or carrier can be secured only on one longitudinal side of the path of travel of the object. It has been found that with such a one-sided mounting in the case of a relatively wide line (for example having three conductors), particularly if it is arranged in a horizontal position, an exact following of the line along the path of travel can be achieved only with difficulty. Further, if one assumes that an ideally exact following of the object along the path of travel can not be at all achieved, as a practical matter, then each coil must be mounted on the associated object in such a manner that its two iron cores are at least during standstill of the object in an exactly symmetric position with respect to the plane of the line. This will at least substantially exclude a sliding of the object, on both iron cores of the coil during lifting movements of same at points on line sections which differ from its desired position with respect to the coil. This requires naturally considerable work during the adjusting of the individual coils of all objects with respect to the line, which coils can as a practical matter not be manufactured entirely equally in their mechanical structure or in their dimensions.

The basic purpose of the invention is to provide for an arrangement of the above-mentioned type means whereby the aforedescribed structural difficulties can be avoided to at least a substantial extent.

SUMMARY OF THE INVENTION

This purpose is attained according to the invention by effecting the coupling of the transmitter and receiver with the line through a coupling unit having a coil having a winding which is distributed advantageously symmetrically only on a single U-shaped frame core of ferromagnetic material. Each frame core is in the case of a line having two conductors (which are parallel to one another) arranged approximately parallel to the line and, with its two pole shoes, symmetrically to the plane of the line. Contrastingly, in the case of a line having three conductors which are parallel to one another in one plane, each frame core is arranged approximately parallel to the line and with its two pole shoes symmetrical to the vertical longitudinal central plane of the line.

The adjustment of the coupling unit, namely the coil relative to the line is in the suggested construction of the coil (with only one frame core) naturally substantially simpler than in a coil with two frame cores between which the line runs. A further important advantage can be seen in that one can support a line having three conductors — thus a line of a relatively great width — over its entire width. In such a line one can for example do away with a support, namely the line can be easily laid in a horizontal position on the path of travel of the object which is of a great advantage not only with respect to an exact course of the line along the path of travel, but also to facilitate its maintenance (for example cleaning without damage to the line). If a line with two parallel conductors is used, only a one-sided mounting is possible. This line can, however, in the aforedescribed arrangement of the coils (opposite of it) normally be laid in a vertical position along the path of travel; this is advantageous for example with respect to the laying of same in curves. Also no support is required of the line, such mostly leading to position inexactnesses.

BRIEF DESCRIPTION OF THE DRAWINGS

Exemplary embodiment of the invention and further developments of same which are set forth in the subclaims will be discussed more in detail hereinafter in connection with the drawings, in which:

DETAILED DESCRIPTION

Figure 1:
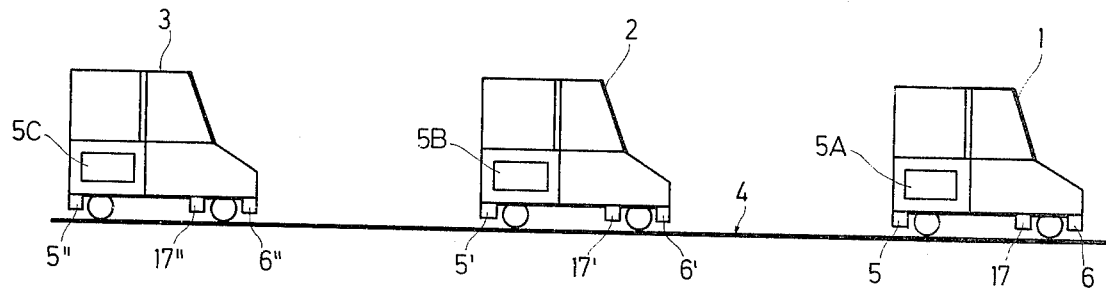
FIG. 1 is a schematic view of three cars equipped with the spacing signalling means with which the invention is used.

The vehicles 1, 2 and 3 which are illustrated in FIG. 1 may, for example, be so-called personnel transport facilities of a short distance travel system, which are intended to travel automatically without stopping from a place of departure to a place of arrival. Such vehicles do not pass one another and hence a single track guide for the vehicles 1, 2 and 3 in connection with a rail or the like will be sufficient.

Figure 2:
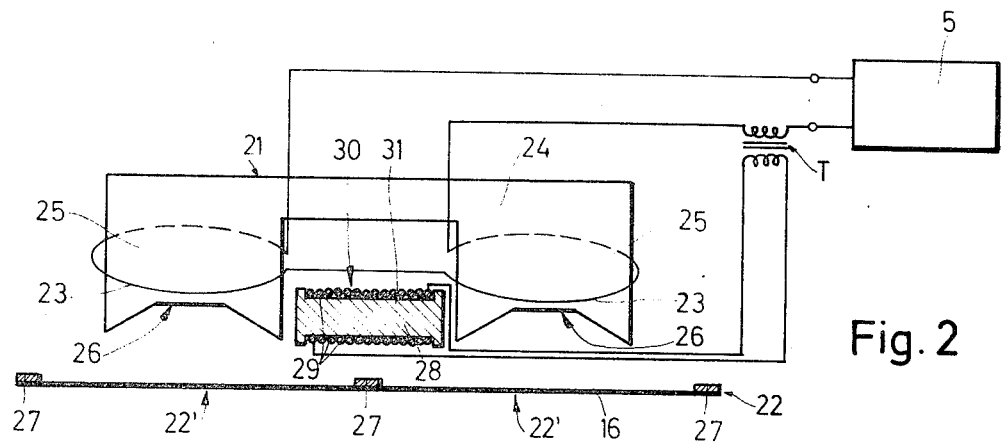
FIG. 2 is a cross-sectional view of a line having three conductors which are parallel to one another and a coupling unit having a coil located between a transmitter or receiver and the line.

Aside from externally predetermined speed limits, the vehicles 1, 2 and 3, and further ones not illustrated are intended to regulate themselves, their speed and their distance from each vehicle directly in front of each respectively, in relation to the speed of such last-named vehicle and independently of reference points on the track 4. Such a mode of operation is only possible if each vehicle 1, 2 and 3, and its travel control 5A, 5B and 5C, respectively, is continuously informed as to the distance from a given vehicle to the vehicle immediately ahead. For this purpose the vehicles 1, 2 and 3 are equipped with transmitting and receiving devices 5, 5′, 5″ or 6, 6′, 6″ which are inductively coupled with a line which is stationarily arranged along the track 4 of the vehicles (FIG. 2). In arrangement of the transmitting and receiving device 5, 5′, 5″ or 6, 6′, 6″ (below the vehicles) as chosen in FIG. 1, the line is on the track 4 and is therefore not here visible.

The transmitting devices 5, 5′ and 5″ may comprise generators for producing a high-frequency alternating current, for example transistor generators, which are each connected to one coil. The receiving devices 6, 6′ and 6″ can each consist of an amplifier (transistor-amplifier) and a coil connected thereto. The coils of the transmitting and receiving devices 5, 5′, 5″ and 6, 6′, 6″ respectively, are of the same construction excepting for the number of their windings.

Further details of the general system to which the present invention is applied are set forth in the above-mentioned U.S Pat. No. 3,836,770 to which reference is herewith made.

The coil 21 which is illustrated in FIG. 2 is the coupling element between a transmitter 5 of a track-carried vehicle 1 and a line 22 which extends along its path of travel, into which line 22 the transmitter, which if necessary is constructed as a transistor-generator, continuously applies an electrical signal in the form of a high-frequency alternating current. This signal is received, for example for assuring the spacing of one vehicle behind the transmitting vehicle, by means of a receiver which in the same manner is coupled with the line 22 (compare the aforesaid U.S. Pat. No. 3,836,770).

The winding 23 of said coil 21 is distributed symmetrically on a singly U-shaped frame core 24 of ferromagnetic material (for example ferrite), which frame core 24 is arranged parallel to the line 22 and with its two pole shoes 25 symmetrical to the vertical longitudinal central plane of the line. In the chosen construction and arrangement of the coil 21 the two loops 22′ of the line 22 are each permeated to the same degree by the magnetic flux. The leakage flux is reduced to an as small as possible degree or small in comparison with the effective flux. The pole surfaces 26 of the pole shoes 25 of the core 24 are concave for the purpose of concentrating the magnetic flux.

The line 22, in the illustrated embodiments, consists of three electrical conductors 27 which extend parallel to one another in a common plane and have a rectangular cross section (so called flat conductors made of copper or the like) of which the two outer ones are equidistant from the central conductor. Further, the conductors 27 are connected conductively to one another over their entire length by a conductive foil 16 whose conductivity is less than the conductivity of the conductors and at least as low as to permit the passage of magnetic flux therethrough. The conductance of the foil relative to the conductance of the conductors 27 is less by one order of magnitude (normally understood to mean a factor of about 10). As already mentioned, it is possible to measure distances between successive vehicles with such a line 22 by using transmitters and receiver. In case the vehicles and thus the respective coils 21 of their transmitter 5 (and their receivers) are subjected to lateral movements or lifting movements relative to the line 22, an auxiliary coil 28, through which flows current from the same source as flows through the main winding 23 such as through the transformer connection T, is arranged between the two pole shoes 25 of the frame core 24 of each coil 21. This auxiliary coil 28 which is if necessary secured on the frame core 24 through appropriate insulation is constructed as a so called elongated coil wherein the individual conductor turns 29 of the winding 30 defined thereby extend on a core member 31 (if necessary of ferromagnetic material) positioned longitudinally of the frame core 24 or its pole shoes 25. The winding 30 can, for example, be connected so as to have the same polarity as the coil 23 which is arranged on the frame core 24. This auxiliary coil 28 with the proper number, form and width of turns causes the field lines in the magnetic field which it produces together with the coil 21, to extend at least in the center of the line 22 (in the zone of its central conductor 27) parallel to the plane of the line. Thus, and at least within this zone, lateral movements of the coil 21 (also the vehicle) do not change the voltage induced in the line by the coil 21. If the vehicles are such vehicles as to carry out vertical movements relative to the line 22, such as might occur in rubber tired supported vehicles, then the auxiliary coil 28 will be poled in such a manner that the field lines of its magnetic field extend oppositely to the field lines of the magnetic field of the coil 21 to effect a cancelling of the flux in this zone. This achieves an almost field-free area in the mentioned central zone of the line 22. The result is that vertical movements of the coil 21 do not lead to any substantial change in the voltage which it induces in the line 22 since all of the flux is caused to flow to the line 22. In other words, the coil 28 can be connected to make the system independent either of lateral movements or vertical movements. In this connection, it should be mentioned that for achieving the aforementioned effecs, it is also possible to provide several auxiliary coils between the pole shoes 25 of the frame core 24. Finally the core member 31 does not need to consist of a magnetic material.

In order to improve in the described coupling of the transmitter 5 (or a receiver) with the line 22 by using a coil with only one frame core 24, there is provided, according to FIG. 3, below the line 22 a rail 32 of ferromagnetic material functioning as a magnetic return circuit for the coil 33, which rail extends longitudinally of said line. This coil 33 corresponds in its structure and in its arrangement with respect to the line 22 substantially to the aforedescribed coil 21. Thus the pole shoes 34 of the coil 33 define with the rail 32 air gaps 35 through which the line 22 extends in the longitudinal direction. The rail 32 is therein arranged symmetrically to the vertical longitudinal central plane of the line 22, which causes the longitudinal central plane of the rail and that of the line to coincide. As further appearing in FIG. 3, the pole shoes 34 of the coil 33 or their frame core 24 — in contrast to the coil 21 of FIG. 2 — conductive loops 37 are provided on the pole surfaces 36 (if necessary by the interpositioning of an insulation) which extends longitudinally of the pole surfaces and in which the distance between its two conductors 38 is less than the width of the associated pole surface. The magnetic flux passes through the conductive loops 37 to induce a current flow in thhe conductor 38. The voltage induced in said conductor loops 37 is provided for generating a negative feedback signal for the transmitter 5 which is connected to the coil 33 or, in case the coil 33 is associated with a receiver, for the negative feedback of its amplifier.

Figure 5:
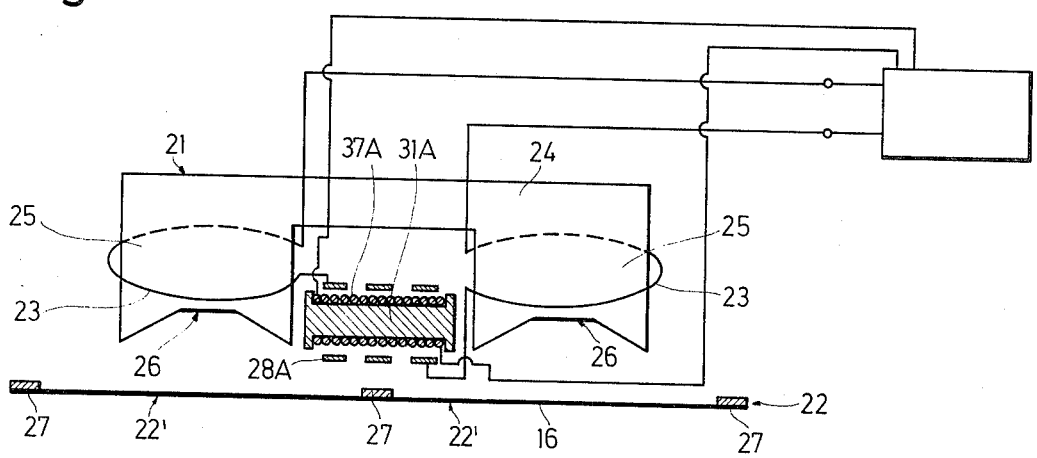
FIG. 5 is a modified circuit for generating a negative feedback signal to the transmitter or the receiver.
Figure 3:
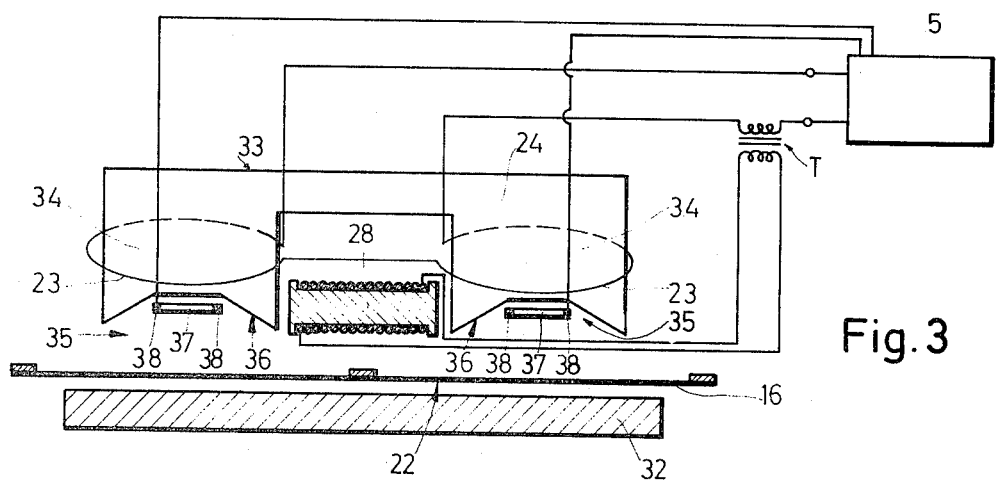
FIG. 3 is a modified circuit located between the coil and a rail which extends parallel to the line.

In the arrangement according to FIG. 3 (having a magnetic return path) vertical movements of the coil 33 relative to the line 22, cause, in contrast to the arrangement of FIG. 2, a change of the relation between the effective flux and the leakage flux. Therefore, one will provide negative feedback to the transmitter 5 (or the amplifier of the receiver) by a voltage which is substantially proportional only to the effective flux from the poles 34. This voltage, as stated above, is obtained by means of the conductor loops 37. In this case, the effective flux is proportional to the signal which is fed to the input of the transmitter 5 (or the input of the amplifier of a receiver), thus proportional to the signal which is to be coupled into the line 22 (or the signal which is to be taken from the line). In other words, the negative feedback signal nullifies variations in the dimension of the air gap. In this connection, it must be noted that the negative feedback to the transmitter 5 (or to the amplifier of the receiver) can be carried out also, if desired additionally, with a voltage which is induced in an auxiliary coil 37A (FIG. 5) which is arranged between the two pole shoes of the frame core 24. The auxiliary coil 37A wound on the core 31A corresponds, if necessary, with the exception of the number of the conductor windings of its coil, substantially to the structure and arrangement of the already described auxiliary coil 28 (FIGS. 2 to 4) and can be provided in place of same or additionally as illustrated in FIG. 5 by the reference 28A. In contrast to this, however, the current of the winding 23 does not flow through the auxiliary coil 37A but same is only permeated by the leakage flux between the pole shoes (of the coil 21 or 33). Thus the voltage induced in the auxiliary coil 37A is a measurement of the respective leakage flux between the pole shoes and can thus show changes of the leakage flux. These changes in the leakage flux are naturally dependent on the respective position of the coil (21 or 33) or its frame core 24 with respect to the line 22. Thus it is possible, with the introduction of the voltage which is induced in the auxiliary coil 37A into the mentioned negative feedback for the transmitter 5 (or the amplifier of the receiver) to compensate for changes (due to the position changes of the coil 21 or 33 which respect to the line) of the signal coupled into the line (or of the signal taken from the line).

In the arrangement illustrated in FIG. 3, the rail 32 will advantageously be at the same time a carrier of the line 22. Thus the line 22 can be supported by means of a (not illustrated) insulating cover of plastic or the like substantially over the entire width on the rail 32. Further, the chosen form of the magnetic return-circuit is not limiting. For this purpose, it is possible to provide also two rails which are arranged parallel to one another in one plane, if necessary having an L-shaped cross section, which rails define an air gap which extends longitudinally of the line. Through this air gap there can be obtained with respect to horizontal movements of the coil 33 relative to the line 22 a more favorable shaping of the magnetic field for the coupling between the coil and the line.

Figure 4:
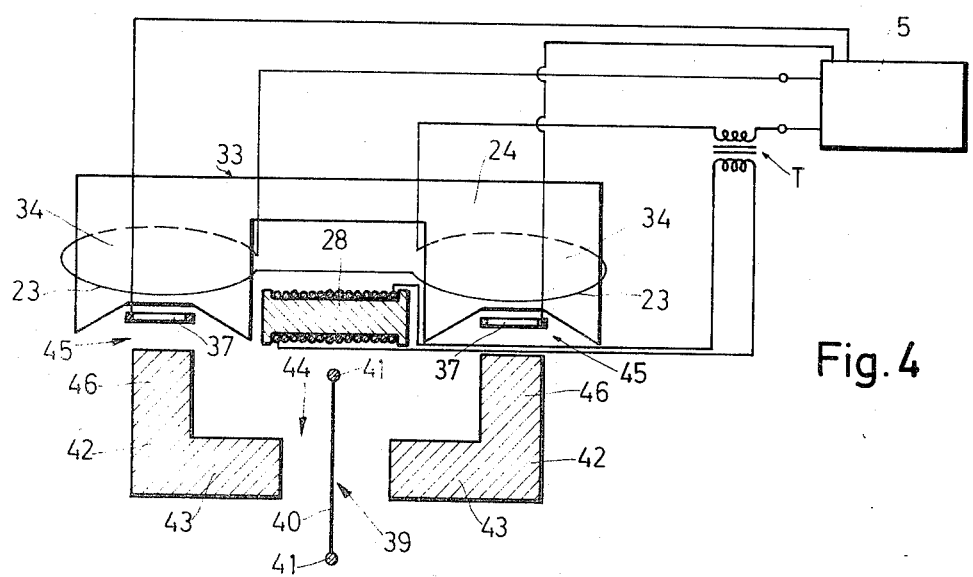
FIG. 4 is a further modified structure opposite a line having two parallel conductors.

Finally FIG. 4 shows an arrangement for coupling the transmitter 5 (or a receiver) with a line 39 which has only two parallel conductors 41 which are (conductively) connected to one another through a conductive foil 40 having the same characteristics as the foil described above. In contrast to the arrangement according to FIG. 3, the frame core 24 of the coil 33 is in this embodiment arranged parallel to the line 39 and, with its two pole shoes 37, symmetrical to the plane of the line. This provides a stationary return-circuit composed of two rails 42 which are L-shaped in cross section and which are arranged symmetrically to the plane of the line 39. The legs 43 of the rails 42 are oppositely directed to the line and are arranged each symmetrically to the vertical longitudinal central plane of the line. The rails 43 together define at their mutually adjacent ends an air gap 44 through which extends the line 39 and at each of the other ends with the pole shoes 34 of the frame core 24 an air gap 45. Also through such a return-circuit compared of course with an arrangement without any return-circuit, there is obtained a substantially better coupling of the coil 33 with the line 39. For the purpose of concentrating the magnetic flux in the air gaps 45, a smaller width is chosen for the legs 46 of the rails 42, which legs are oppositely directed to the pole shoes 34, than for the respective pole shoes. However, this construction is not essential.

Referring to the above described auxiliary coils, same are of course also advantageous in arrangements in which coils having two U-shaped iron cores are provided as coupling elements between transmitter and receiver and the line.

Although particular preferred embodiments of the invention have been disclosed above for illustrative purposes, it will be understood that variations or modifications thereof which lie within the scope of the invention are fully contemplated.

The embodiments of the invention in which an inclusive property or privilege is claimed are defined as follows:

1. In an arrangement for measuring the distance between two successive track-carried objects each being equipped with a transmitter and a receiver by transmitting an electrical signal of a defined magnitude, said signal being sent out by a transmitter of the forward object to a receiver of the next following object, said receiver having a defined sensitivity, said transmitter and receiver being coupled through an electric line having at least two conductors which are parallel to one another and conductively connected over the entire length by a foil of lesser conductivity, the improvement comprising a coil mounted on and movable with said object for coupling said transmitter and receiver with said electrical line, said coil comprising a winding which is distributed symmetrically only on one U-shaped frame core of ferromagnetic material having a pair of pole shoes and electrical compensation means for electrically compensating for effects on said electrical signal caused by either a lateral displacement or a vertical displacement between said electrical line and said coil whereby said electrial signals from said transmitter and said electrical signals to said receiver will be unaffected by said lateral or vertical displacements.

2. An arrangement according to claim 1, wherein said electrical line having at least two conductors is a line composed of two conductors, wherein each frame core is arranged approximately parallel to the line and with its 2 pole shoes symmetrical to the plane of the line.

3. An arrangement according to claim 1, wherein said electrical line having at least two conductors is a line composed of three conductors which are parallel to one another and are coplanar, wherein each frame core is arranged approximately parallel to the line and with its two pole shoes symmetrical to the vertical longitudinal central plane of the line.

4. An arrangement according to claim 1, wherein said elelctrical compensating means comprises at least one auxiliary coil located between the 2 pole shoes of each frame core and has conductor windings which extend longitudinally of the frame core, through which auxiliary core flows preferably current from the same sources as flows through said first mentioned winding.

5. An arrangement according to claim 1, wherein said electrical compensating means comprises at least one auxiliary coil located in the zone of the 2 pole shoes with conductor windings extending in longitudinal direction of the frame core, said conductor winding sensing changes of the leakage flux between the pole shoes.

6. An arrangement according to claim 1, wherein the spacing between the pole shoes of each frame core and at least one stationary rail of ferromagnetic material functioning as a magnetic return-circuit for the coils, define air gaps, said rail extending approximately parallel to the line.

7. An arranagement according to claim 6, wherein the rail is arranged symmetrical to the vertical longitudinal central plane of the line which extends through the air gaps.

8. An arrangement according to claim 6, wherein the rail is at the same time the carrier of the line.

9. An arrangement according to claim 7, wherein the pole surfaces of the pole shoes are constructed concavely.

10. In an arrangement for measuring the distance between two successive track-carried objects each being equipped with a transmitter and a receiver by transmitting an electrical signal of a defined magnitude, said signal being sent out by a transmitter of the forward object to a receiver of the next following object, said receiver having a defined sensitivity, said transmitter and receiver being coupled through an electric line having at least two conductors which are parallel to one another and conductively connected over the entire length by a foil of lesser conductivity, the improvement comprising a coil mounted on and movable with said object for coupling said transmitter and receiver with said electrical line, said coil comprising a winding which is distributed symmetrically only on one U-shaped frame core of ferromagnetic material having a pair of pole shoes and a stationary return-circuit defined by two rails which are approximately L-shaped in cross section and are arranged symmetrical to the plane of the line, said rails having mutually adjacent ends which define an air gap therebetween through which extends the line and defining by their own ends and the spaced pole shoes respectively of each frame core other air gaps.

11. An arrangement according to claim 10, wherein the legs of the rails which are directed toward the line are arranged each symmetrically to the vertical longitudinal central plane of the line.

12. An arrangement according to claim 10, wherein the legs of the rails which are directed toward the pole shoes have each a smaller width than the associated pole shoe.

13. In an arrangement for measuring the distance between two successive track-carried objects each being equipped with a transmitter and a receiver by transmitting an electrical signal of a defined magnitude, said signal being sent out by a transmitter of the forward object to a receiver of the next following objects, said receiver having a defined sensitivity, said transmitter and receiver being coupled through an electric line having at least two conductors which are parallel to one another and conductively connected over the entire length by a foil of lesser conductivity, the improvement comprising a coil mounted on and movable with said object for coupling said transmitter and receiver with said electrical line, said coil comprising a winding which is distributed symmetrically only on one U-shaped frame core of ferromagnetic material having a pair of pole shoes, each of said pole shoes having a pole surface, at least one conductor loop on each pole surface extending in its longitudinal direction, the distance between two of said conductors being less than the width of the pole surface.

* * * * *

UNITED STATES PATENT OFFICE
CERTIFICATE OF CORRECTION

Patent No. 3,902,689        Dated September 2, 1975

Inventor(s) Walter Hermann, Peter Kraus and Burkhart Kuhl

It is certified that error appears in the above-identified patent and that said Letters Patent are hereby corrected as shown below:

Please correct the spelling of the Assignee's name to

---Messerschmitt-Boelkow-Blohm GmbH---.

Signed and Sealed this ninth Day of March 1976

[SEAL]

Attest:

RUTH C. MASON
*Attesting Officer*

C. MARSHALL DANN
*Commissioner of Patents and Trademarks*